US012735358B2

(12) United States Patent
Blades et al.

(10) Patent No.: US 12,735,358 B2
(45) Date of Patent: Sep. 15, 2026

(54) GYPSUM BOARD INCLUDING A COATED FACING MATERIAL

(71) Applicant: Gold Bond Building Products, LLC, Charlotte, NC (US)

(72) Inventors: Michael N. Blades, Indian Land, SC (US); Dalton Steed, Charlotte, NC (US); Bradley J. Busche, Shelby, NC (US); Joseph J. Bailey, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 969 days.

(21) Appl. No.: 17/836,058

(22) Filed: Jun. 9, 2022

(65) Prior Publication Data

US 2022/0411330 A1 Dec. 29, 2022

Related U.S. Application Data

(60) Provisional application No. 63/209,569, filed on Jun. 11, 2021.

(51) Int. Cl.

| | |
|---|---|
| ***C04B 28/14*** | (2006.01) |
| ***C04B 111/00*** | (2006.01) |
| ***C09D 133/08*** | (2006.01) |
| ***C09D 133/10*** | (2006.01) |
| ***C09D 163/00*** | (2006.01) |
| ***C09D 183/08*** | (2006.01) |

(52) U.S. Cl.

CPC ............ *C04B 28/14* (2013.01); *C09D 133/08* (2013.01); *C09D 133/10* (2013.01); *C09D 163/00* (2013.01); *C09D 183/08* (2013.01); *C04B 2111/00629* (2013.01)

(58) Field of Classification Search

CPC .......... C04B 28/14; C04B 2111/00629; C09D 133/08; C09D 133/10; C09D 163/00; C09D 183/08; C09D 143/04; B32B 2262/101; B32B 5/02; B32B 9/047; C08G 77/04; C08K 3/36; C08L 83/04; E04B 2/723; E04H 9/16

See application file for complete search history.

(56) References Cited

U.S. PATENT DOCUMENTS

| | | | | |
|---|---|---|---|---|
| 9,067,821 | B2 * | 6/2015 | Bleecher | C23C 4/10 |
| 10,060,058 | B2 | 8/2018 | Teng et al. | |
| 2003/0232182 | A1 | 12/2003 | Bruce et al. | |
| 2009/0064894 | A1 * | 3/2009 | Baumgart | C09D 5/1656 106/287.18 |
| 2013/0115837 | A1 | 5/2013 | Kitchen et al. | |
| 2015/0068657 | A1 | 3/2015 | Jogikalmath et al. | |
| 2015/0125612 | A1 * | 5/2015 | Campeol | B01J 13/18 427/340 |
| 2016/0096970 | A1 * | 4/2016 | Hartley | C09D 133/08 206/568 |
| 2017/0218223 | A1 * | 8/2017 | Bodkhe | C08L 71/02 |

FOREIGN PATENT DOCUMENTS

| | | | | |
|---|---|---|---|---|
| AU | 2002245308 A1 * | 2/2003 | | |
| WO | WO-2008062018 A1 * | 5/2008 | | C04B 20/1051 |

OTHER PUBLICATIONS

Ibrahim et al., "Use of Surface Treatment Materials to Improve Concrete Durability", 1999, J. Mater. Civ. Eng., 11, 36-40 (Year: 1999).*

Wang et al., "Effect of PDMS on the waterproofing performance and corrosion resistance of cement mortar", 2020, Applied Surface Science, 507, 145016 (Year: 2020).*

"DensGlass(R) Sheathing", Georgia-Pacific (Year: 2018).*

Georgia-Pacific, "DensGlass Sheathing" (Year: 2018).*

* cited by examiner

*Primary Examiner* — Amber R Orlando
*Assistant Examiner* — Ryan Patrick Loughran
(74) *Attorney, Agent, or Firm* — Dority & Manning, P.A.

(57) ABSTRACT

In general, the present invention is directed to a gypsum board comprising a gypsum core and a glass mat facing material including a coating. The coating comprises a resin including an acrylic resin, a siloxane rubber, or a mixture thereof and hydrophobic additive comprising an organosilane. The gypsum board passes at least one of the three air and water barrier tests specified in AC-212 wherein the tests comprise a water penetration barrier test as conducted in accordance with ASTM E331-00, a hydrostatic head test as conducted in accordance with AATCC 127-2008, or an air barrier test as conducted in accordance with ASTM E2357-11.

23 Claims, No Drawings

GYPSUM BOARD INCLUDING A COATED FACING MATERIAL

CROSS-REFERENCE TO RELATED APPLICATION

The present application claims filing benefit of U.S. Provisional Patent Application Ser. No. 63/209,569 having a filing date of Jun. 11, 2021, and which is incorporated herein by reference in its entirety.

BACKGROUND

A building is typically constructed with walls having a frame comprising vertically oriented studs connected by horizontally oriented top and bottom plates or tracks. The exterior surfaces of these buildings may also be faced with gypsum boards. However, when utilizing gypsum boards for certain applications, such as for exterior surfaces, they should satisfy certain air and moisture barrier properties in order to maintain the integrity of the board as well as the building structure. Currently, one method to achieve such properties is by utilizing peel and stick films on these boards. For example, these gypsum boards typically include a gypsum core and facing materials on the major surfaces. In addition to the facing materials, a peel and stick film may be applied. However, utilization of such a film can at times result in a less efficient manufacturing process as well as increased costs.

Alternatively, a field applied liquid air & water barrier may be applied to the gypsum board. However, applying such a barrier in the field can be affected by weather and quality control and adds the cost of scaffolding, as well as overall cost. In order to address some or all of these concerns, a field applied coating could be applied during the manufacturing process or in an offline process. However, the nature of the coating is to maintain elasticity during installation, particularly when fasteners are used to secure the board to a framed structure. This elasticity helps seal around penetrations and improve the resistance to water intrusion. However, when applying such a coating to a gypsum board, the practice of stacking the boards together for shipment causes the panels to stick together or "block."

As a result, there is still a need to further improve gypsum boards, as well as a process of manufacturing gypsum boards, that provide the desired air and moisture barrier properties. In particular, there is a need to provide a pre-applied coating to a gypsum board that may be stacked, handled, and installed without blocking, damaging the coating, etc. and still achieve the desire performance as an air and moisture barrier.

SUMMARY OF THE INVENTION

In accordance with one embodiment of the present invention, a gypsum board is disclosed. The gypsum board comprises a gypsum board comprising a gypsum core and a glass mat facing material including a coating. The coating comprises a resin including an acrylic resin, a siloxane rubber, or a mixture thereof and a hydrophobic additive comprising an organosilane. The gypsum board passes at least one of the three air and water barrier tests specified in AC-212 wherein the tests comprise a water penetration barrier test as conducted in accordance with ASTM E331-00, a hydrostatic head test as conducted in accordance with AATCC 127-2008, or an air barrier test as conducted in accordance with ASTM E2357-11.

DETAILED DESCRIPTION

Reference now will be made in detail to various embodiments. Each example is provided by way of explanation of the embodiments, not as a limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a gypsum board and a method of making such a gypsum board. In particular, the present invention is directed to a gypsum board including a facing material having a particular coating. In this regard, the combination of the glass mat facing material and coating as disclosed herein can provide a gypsum board with the desired air and water barrier properties.

For example, the gypsum board can pass specific air and water barrier tests, in particular the ASTM standards specified in ICC Acceptance Criteria AC-212. For example, AC-212 provides water penetration barrier requirements as measured by ASTM E331-00, hydrostatic head tests as measured by AATCC 127-2008, and air barrier requirements as measured by ASTM E2357-11. In this regard, in one embodiment, the gypsum board may pass a hydrostatic head test against water leakage as measured by AATCC 127-2008. In one embodiment, the gypsum board may display no water penetration when measured by ASTM E331-00 and ASTM E2357-11 procedure A. In one embodiment, the gypsum board may satisfy the air barrier requirements as measured by ASTM E2357-11. In a further embodiment, the gypsum board may satisfy the nail-sealing requirements as determined by ASTM D1970-20, section 7.9.

Regarding the water penetration test, the gypsum board passes the test generally when water does not pass through the field or perimeter of the assembly. However, it should generally be understood that penetration due to manufacturing and/or installation issues shall not be considered as a fail; instead, the assembly would need to be rebuilt and tested again.

Regarding the hydrostatic head test, the gypsum board may exhibit a passing rate of at least 80%, such as at least 85%, such as at least 90%, such as at least 95%, such as at least 100% as measured according to AATCC 127-2008. In one embodiment, the gypsum board may display a column water loss of less than 0.25 inches, such as less than 0.2 inches, such as less than 0.15 inches, such as less than 0.1 inches, such as less than 0.05 inches when measured according to AATCC 127-2008. In one embodiment, the gypsum board may display a water gain of less than 0.5%, such as less than 0.4%, such as less than 0.3%, such as less than 0.2% when measured according to AATCC 127-2008. Furthermore, in accordance with Sections 4.3 and 4.8.4 of AC-212, the gypsum board shall pass the hydrostatic head test by not exhibiting any cracking of the coating, bond failure between the coating the substrate, or water penetration on the plane of the exterior facing side of the substrate.

Regarding the air barrier requirements, an opaque wall assembly and a second assembly having penetrations defined by the standard are utilized. First, the opaque assembly is tested to provide a baseline air leakage rate at a pressure of 75 Pa. Then, the air leakage is determined for the penetration wall assembly at the same pressure. With the gypsum board as defined herein, if the measured air leakage rate passing through the wall with penetrations is greater than 10% of the opaque wall, the test fails. In this regard, with the gypsum board as described herein, the percentage may be 10% or less, such as 9% or less, such as 8% or less, such as 7% or less, such as 6% or less, such as 5% or less, such as 4% or less, such as 3% or less, such as 2% or less. In addition, the air leakage of the air barrier assembly may be 0.2 $L/(s \cdot m^2)$ or less, such as 0.18 $L/(s \cdot m^2)$ or less, such as 0.16 $L/(s \cdot m^2)$ or less, such as 0.14 $L/(s \cdot m^2)$ or less, such as 0.12 $L/(s \cdot m^2)$ or less, such as 0.1 $L/(s \cdot m^2)$ or less, such as 0.08 $L/(s \cdot m^2)$ or less, such as 0.06 $L/(s \cdot m^2)$ or less. The air leakage rate may be more than 0 $L/(s \cdot m^2)$, such as 0.01 $L/(s \cdot m^2)$ or more, such as 0.02 $L/(s \cdot m^2)$ or more, such as 0.03 $L/(s \cdot m^2)$ or more, such as 0.05 $L/(s \cdot m^2)$ or more, such as 0.07 $L/(s \cdot m^2)$ or more.

Regarding the nail sealability test, the gypsum board may exhibit a passing rate of at least 80%, such as at least 85%, such as at least 90% as measured according to ASTM D1970-20, section 7.9. In one embodiment, the lower chamber can show no water accumulation or water on the lower shanks of the nails, as visually observed in accordance with ASTM D1970-20, section 7.9. In addition, in one embodiment, the gypsum board may display a water gain of less than 0.5%, such as less than 0.4%, such as less than 0.3%, such as less than 0.2% when measured according to ASTM C473.

As indicated herein, the present invention discloses a gypsum board. The gypsum board includes a gypsum core having a gypsum layer surface. In particular, the gypsum layer surface includes a first gypsum layer surface and a second gypsum layer surface opposing the first gypsum layer surface. In general, these surfaces may be the major surfaces of the gypsum core. A facing material is provided on the gypsum layer surface. For instance, a first facing material is provided on the first gypsum layer surface and a second facing material is provided on the second gypsum layer surface. In this regard, the first facing material and the second facing material sandwich the gypsum core.

In general, the present invention is also directed to a method of making a gypsum board. For instance, in the method of making a gypsum board, a first facing material may be provided wherein the first facing material has a first facing material surface and a second facing material surface opposite the first facing material surface. The first facing material may be conveyed on a conveyor system (i.e., a continuous system for continuous manufacture of gypsum board). Thereafter, a gypsum slurry may be provided or deposited onto the first facing material in order to form and provide a gypsum core. Next, a second facing material may be provided onto the gypsum slurry. After deposition of the gypsum slurry, the calcium sulfate hemihydrate reacts with the water to convert the calcium sulfate hemihydrate into a matrix of calcium sulfate dihydrate. Such reaction may allow for the stucco to set and become firm thereby allowing for the board to be cut at the desired length. In this regard, the method may comprise a step of reacting calcium sulfate hemihydrate with water to form calcium sulfate dihydrate or allowing the calcium sulfate hemihydrate to convert to calcium sulfate dihydrate. In this regard, the method may allow for the slurry to set to form a gypsum board. In addition, the method may also comprise a step of cutting a continuous gypsum sheet into a gypsum board. Then, after the cutting step, the method may comprise a step of supplying the gypsum board to a heating or drying device. For instance, such a heating or drying device may be a kiln and may allow for removal of any free water. The temperature and time required for heating in such heating or drying device are not necessarily limited by the present invention.

In general, the composition of the gypsum slurry and gypsum core is not necessarily limited and may be any generally known in the art. Generally, in one embodiment, the gypsum core is made from a gypsum slurry including at least stucco and water. In this regard, the method may also include a step of combining stucco, water, and any other optional additives as mentioned herein. In general, stucco may be referred to as calcined gypsum or calcium sulfate hemihydrate. The calcined gypsum may be from a natural source or a synthetic source and is thus not necessarily limited by the present invention. For instance, gypsum is conventionally prepared by grinding and calcining at relatively high temperatures to form the calcined gypsum or calcium sulfate hemihydrate. Typically, when the gypsum undergoes calcination and rehydration, the gypsum crystals are formed in a needle-shape (e.g., acicular).

In addition to the stucco, the gypsum slurry may also contain some calcium sulfate dihydrate or calcium sulfate anhydrite. If calcium sulfate dihydrate is present, the hemihydrate is present in an amount of at least 50 wt. %, such as at least 60 wt. %, such as at least 70 wt. %, such as at least 80 wt. %, such as at least 85 wt. %, such as at least 90 wt. %, such as at least 95 wt. %, such as at least 98 wt. %, such as at least 99 wt. % based on the weight of the calcium sulfate hemihydrate and the calcium sulfate dihydrate. Furthermore, the calcined gypsum may be $\alpha$-hemihydrate, $\beta$-hemihydrate, or a mixture thereof.

In addition to the stucco, the gypsum slurry may also contain other hydraulic materials. These hydraulic materials may include calcium sulfate anhydrite, land plaster, cement, fly ash, or any combinations thereof. When present, they may be utilized in an amount of 30 wt. % or less, such as 25 wt. % or less, such as 20 wt. % or less, such as 15 wt. % or less, such as 10 wt. % or less, such as 8 wt. % or less, such as 5 wt. % or less based on the total content of the hydraulic material and the calcium sulfate hemihydrate.

In general, the gypsum is present in an amount of at least 50 wt. %, such as at least 60 wt. %, such as at least 70 wt. %, such as at least 80 wt. %, such as at least 90 wt. %, such as at least 95 wt. %, such as at least 98 wt. %, such as at least 99 wt. % based on the weight of the solids in the gypsum slurry. The gypsum is present in an amount of 100 wt. % or less, such as 99 wt. % or less, such as 98 wt. % or less, such as 95 wt. % or less, such as 90 wt. % or less based on the weight of the solids in the gypsum slurry.

In addition, the gypsum, in particular the calcium sulfate dihydrate, is present in the gypsum core in an amount of at least 50 wt. %, such as at least 60 wt. %, such as at least 70 wt. %, such as at least 80 wt. %, such as at least 90 wt. %, such as at least 95 wt. %, such as at least 98 wt. %, such as at least 99 wt. %. The gypsum is present in an amount of 100 wt. % or less, such as 99 wt. % or less, such as 98 wt. % or less, such as 95 wt. % or less, such as 90 wt. % or less based on the weight of the solids in the gypsum slurry. In one embodiment, the aforementioned weight percentages are based on the weight of the gypsum core. In another embodiment, the aforementioned weight percentages are based on the weight of the gypsum board.

As indicated above, the gypsum slurry may also include water. Water may be employed for fluidity and also for rehydration of the gypsum to allow for setting. The amount of water utilized is not necessarily limited by the present invention.

In addition, the weight ratio of the water to the stucco may be 0.2 or more, such as 0.2 or more, such as 0.3 or more, such as 0.4 or more, such as 0.5 or more. The water to stucco weight ratio may be 4 or less, such as 3.5 or less, such as 3 or less, such as 2.5 or less, such as 2 or less, such as 1.7 or less, such as 1.5 or less, such as 1.4 or less, such as 1.3 or less, such as 1.2 or less, such as 1.1 or less, such as 1 or less, such as 0.9 or less, such as 0.85 or less, such as 0.8 or less, such as 0.75 or less, such as 0.7 or less, such as 0.6 or less, such as 0.5 or less, such as 0.4 or less, such as 0.35 or less, such as 0.3 or less, such as 0.25 or less, such as 0.2 or less.

In addition to the stucco and the water, the gypsum slurry may also include any other conventional additives as known in the art. In this regard, such additives are not necessarily limited by the present invention. For instance, the additives may include dispersants, foam or foaming agents including aqueous foam (e.g. sulfates), set accelerators (e.g., BMA, land plaster, sulfate salts, etc.), set retarders, binders, biocides (such as bactericides and/or fungicides), adhesives, pH adjusters, thickeners (e.g., silica fume, Portland cement, fly ash, clay, celluloses, high molecular weight polymers, etc.), leveling agents, non-leveling agents, starches (such as pregelatinized starch, non-pregelatinized starch, and/or an acid modified starch), colorants, fire retardants or additives (e.g., silica, silicates, expandable materials such as vermiculite, perlite, etc.), water repellants, fillers (e.g., glass fibers), waxes, secondary phosphates (e.g., condensed phosphates or orthophosphates including trimetaphosphates, polyphosphates, and/or cyclophosphates, etc.), mixtures thereof, natural and synthetic polymers, etc. In general, it should be understood that the types and amounts of such additives are not necessarily limited by the present invention.

In general, each additive may be present in the gypsum slurry in an amount of 0.0001 wt. % or more, such as 0.001 wt. % or more, such as 0.01 wt. % or more, such as 0.02 wt. % or more, such as 0.05 wt. % or more, such as 0.1 wt. % or more, such as 0.15 wt. % or more, such as 0.2 wt. % or more, such as 0.25 wt. % or more, such as 0.3 wt. % or more, such as 0.5 wt. % or more, such as 1 wt. % or more, such as 2 wt. % or more based on the weight of the stucco. The additive may be present in an amount of 20 wt. % or less, such as 15 wt. % or less, 10 wt. % or less, such as 7 wt. % or less, such as 5 wt. % or less, such as 4 wt. % or less, such as 3 wt. % or less, such as 2.5 wt. % or less, such as 2 wt. % or less, such as 1.8 wt. % or less, such as 1.5 wt. % or less, such as 1 wt. % or less, such as 0.8 wt. % or less, such as 0.6 wt. % or less, such as 0.5 wt. % or less, such as 0.4 wt. % or less, such as 0.35 wt. % or less, such as 0.2 wt. % or less based on the weight of the stucco. The aforementioned weight percentages may also apply based on the weight of the gypsum in the gypsum board. In addition, the aforementioned weight percentages may also apply based on the weight of the gypsum board. Further, the aforementioned weight percentages may also apply based on the weight of the gypsum core. Also, the aforementioned weight percentages may also apply based on the solids content of the gypsum slurry.

The manner in which the components for the gypsum slurry are combined is not necessarily limited. For instance, the gypsum slurry can be made using any method or device generally known in the art. In particular, the components of the slurry can be mixed or combined using any method or device generally known in the art. For instance, the components of the gypsum slurry may be combined in any type of device, such as a mixer and in particular a pin mixer. In this regard, the manner in which the components are incorporated into the gypsum slurry is not necessarily limited by the present invention. Such components may be provided prior to a mixing device, directly into a mixing device, and/or even after the mixing device. For instance, the respective components may be provided prior to a mixing device. In another embodiment, the respective components may be provided directly into a mixing device. Alternatively, the respective components may be provided after the mixing device (such as to the canister or boot, using a secondary mixer, or applied directly onto the slurry after a mixing device) and may be added directly or as part of a mixture. Whether provided prior to, into, or after the mixing device, the components may be combined directly with another component of the gypsum slurry. In addition, whether providing the components prior to or after the mixing device or directly into the mixing device, the compound may be delivered as a solid, as a dispersion/solution, or a combination thereof.

In one embodiment, the gypsum core may include a first gypsum layer and a second gypsum layer. The first gypsum layer may be between the first facing material (i.e., front of the board) and the second gypsum layer. In addition, the first gypsum layer may have a density greater than the second gypsum layer. Accordingly, the first gypsum layer may be formed using a gypsum slurry without the use of a foaming agent or with a reduced amount of foaming agent, which may be utilized in forming the second gypsum layer. In this regard, in one embodiment, the first gypsum layer may have the same composition as the second gypsum layer except that the second gypsum layer may be formed using a foaming agent or a greater amount of foaming agent.

In one embodiment, the gypsum core may also include a third gypsum layer. The third gypsum layer may be provided between the second gypsum layer and a second facing material. Like the first gypsum layer, the third gypsum layer may also be a dense gypsum layer. In particular, the third gypsum layer may have a density greater than the second gypsum layer. Accordingly, the third gypsum layer may be formed using a gypsum slurry without the use of a foaming agent or with a reduced amount of foaming agent, which may be utilized in forming the second gypsum layer. In this regard, in one embodiment, the third gypsum layer may have the same composition as the second gypsum layer except that the second gypsum layer may be formed using a foaming agent or a greater amount of foaming agent.

In this regard, when the gypsum core includes multiple gypsum layers, the gypsum slurry may be deposited in multiple steps for forming the gypsum core. For instance, each gypsum layer may require a separate deposition of gypsum slurry. In this regard, with a first gypsum layer and a second gypsum layer, a first gypsum slurry may be deposited followed by a second gypsum slurry. The first gypsum slurry and the second gypsum slurry may have the same composition except that the second gypsum slurry may include a foaming agent or more foaming agent than the first gypsum slurry. In this regard, in one embodiment, the first gypsum slurry may not include a foaming agent. Accordingly, the first gypsum slurry may result in a dense gypsum layer, in particular a non-foamed gypsum layer. Such gypsum layer may have a density greater than the gypsum layer formed from the second gypsum slurry, or foamed gypsum layer.

Similarly, when the gypsum core includes three gypsum layers, the gypsum slurry may be deposited in three steps for forming the gypsum core. For example, a first and second gypsum slurry may be deposited as indicated above and a third gypsum slurry may be deposited onto the second gypsum slurry. The third gypsum slurry and the second gypsum slurry may have the same composition except that the second gypsum slurry may include a foaming agent or more foaming agent than the third gypsum slurry. In this regard, in one embodiment, the third gypsum slurry may not include a foaming agent. Accordingly, the third gypsum slurry may result in a dense gypsum layer, in particular a non-foamed gypsum layer. Such gypsum layer may have a density greater than the gypsum layer formed from the second gypsum slurry, or foamed gypsum layer.

The first gypsum layer may have a thickness that is 0.5% or more, such as 1% or more, such as 2% or more, such as 3% or more, such as 4% or more, such as 5% or more, such as 10% or more, such as 15% or more the thickness of the second (or foamed) gypsum layer. The thickness may be 80% or less, such as 60% or less, such as 50% or less, such as 40% or less, such as 30% or less, such as 25% or less, such as 20% or less, such as 15% or less, such as 10% or less, such as 8% or less, such as 5% or less the thickness of the second (or foamed) gypsum layer. In one embodiment, such relationship may also be between the third gypsum layer and the second gypsum layer.

The density of the second (or foamed) gypsum layer may be 0.5% or more, such as 1% or more, such as 2% or more, such as 3% or more, such as 4% or more, such as 5% or more, such as 10% or more, such as 15% or more the density of the first (or non-foamed) gypsum layer. The density of the second (or foamed) gypsum layer may be 80% or less, such as 60% or less, such as 50% or less, such as 40% or less, such as 30% or less, such as 25% or less, such as 20% or less, such as 15% or less, such as 10% or less, such as 8% or less, such as 5% or less the density of the first (or non-foamed) gypsum layer. In one embodiment, such relationship may also be between the third gypsum layer and the second gypsum layer. In addition, in one embodiment, all of the gypsum layers may have a different density.

The facing material may be any glass mat facing material as generally employed in the art. In general, the first facing material and the second facing material may be the same type of material.

In one embodiment, at least one of the first and second facing materials may be a glass mat facing material. For instance, in one embodiment, both of the first and second facing materials may be a glass mat facing material. In addition, at least one of the first and second facing materials may include a coating. In one embodiment, both of the first and second facing materials may include a coating. Alternatively, in one embodiment, only one of the first and second facing materials may include a coating. For example, in one embodiment, only one of the facing materials, such as the first facing material, may include a coating. In this regard, the coating may be on a facing material surface opposing the facing material surface adjacent the gypsum core. In other words, the coating may be on the exterior of the gypsum board such that it is exposed on the facing material, such as the first facing material.

The coating may include a resin including an acrylic resin, a siloxane rubber, or a mixture thereof and a hydrophobic additive comprising an organosilane. The coating may also include other components, such as a dispersant, a surfactant, a rheology modifier, a coalescing agent, a rust inhibitor, a filler, a pigment or coloring agent, or a mixture thereof. In one embodiment, the coating may include all of the aforementioned components.

The resin may be present in the coating in an amount of 20 wt. % or more, such as 30 wt. % or more, such as 40 wt. % or more, such as 50 wt. % or more, such as 60 wt. % or more, such as 70 wt. % or more, such as 80 wt. % or more, such as 90 wt. % or more. The resin may be present in the coating in an amount of less than 100 wt. %, such as 98 wt. % or less, such as 95 wt. % or less, such as 93 wt. % or less, such as 90 wt. % or less, such as 80 wt. % or less, such as 70 wt. % or less, such as 60 wt. % or less, such as 50 wt. % or less.

The acrylic resin may be one that is formed from one or more acrylate monomers or polymers, such as methacrylate monomers or polymers. For example, the acrylate monomers may include, but are not limited to, methacrylate, methyl acrylate, methyl methacrylate, ethyl acrylate, ethyl methacrylate, n-propyl acrylate, n-propyl methacrylate, isopropyl acrylate, isopropyl methacrylate, hydroxyethyl methacrylate, n-butyl acrylate, n-butyl methacrylate, isobutyl acrylate, isobutyl methacrylate, tert-butyl acrylate, tert-butyl methacrylate, hexyl acrylate, hexyl methacrylate, 2-ethylhexyl acrylate, octyl acrylate, isooctyl acrylate, n-decyl acrylate, isodecyl acrylate, 2-hydroxyethyl acrylate, acrylamide, and other acrylic groups. However, it should be understood that other acrylate monomers or polymers known in the art may also be utilized according to the present invention. The acrylic resin may be present in the coating in an amount of 20 wt. % or more, such as 30 wt. % or more, such as 40 wt. % or more, such as 50 wt. % or more, such as 60 wt. % or more, such as 70 wt. % or more, such as 80 wt. % or more, such as 90 wt. % or more. The acrylic resin may be present in the coating in an amount of less than 100 wt. %, such as 98 wt. % or less, such as 95 wt. % or less, such as 93 wt. % or less, such as 90 wt. % or less, such as 80 wt. % or less, such as 70 wt. % or less, such as 60 wt. % or less, such as 50 wt. % or less.

The siloxane rubber may be one that is thermoplastic or thermoset. In one embodiment, the siloxane may be a thermoplastic. In another embodiment, the siloxane may be a thermoset. The siloxane may be a polyorganosiloxane. Silicon-bonded organic groups used in these polymers may contain monovalent hydrocarbon and/or monovalent halogenated hydrocarbon groups. Such monovalent groups typically have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). Typically, at least 50%, and more desirably at least 80%, of the organic groups are methyl. Examples of such methylpolysiloxanes may include, for instance, polydimethylsiloxane ("PDMS"), polymethylhydrogensiloxane, etc. Still other suitable methyl polysiloxanes may include dimethyldiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, etc.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Alkoxy-modified organopolysiloxanes may also be employed, such as dimethoxypolydimethylsiloxane, methoxy-trimethylsiloxypolydimethylsiloxane, diethoxypolydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes.

The siloxane rubber may have the following general formula:

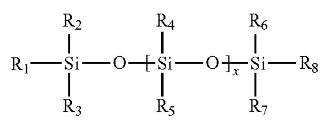

wherein,

- x is an integer greater than 1; and
- $R_1$, $R_2$, $R_3$, $R_4$, $R_5$, $R_6$, $R_7$, and $R_8$ are independently monovalent groups typically containing from 1 to about 20 carbon atoms, such as alkyl groups (e.g., methyl, ethyl, propyl, pentyl, octyl, undecyl, octadecyl, etc.); alkoxy groups (e.g., methoxy, ethoxy, propoxy, etc.); carboxyalkyl groups (e.g., acetyl); cycloalkyl groups (e.g., cyclohexyl); alkenyl groups (e.g., vinyl, allyl, butenyl, hexenyl, etc.); aryl groups (e.g., phenyl, tolyl, xylyl, benzyl, 2-phenylethyl, etc.); and halogenated hydrocarbon groups (e.g., 3,3,3-trifluoropropyl, 3-chloropropyl, dichlorophenyl, etc.). Examples of such polyorganosiloxanes may include, for instance, polydimethylsiloxane ("PDMS"), polymethylhydrogensiloxane, dimethyldiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, fluoro-modified polysiloxane, etc. The siloxane rubber may be formed by crosslinking using any of a variety of known techniques, such as by catalyst curing (e.g., platinum catalysts), room temperature vulcanization, moisture curing, etc. Crosslinking agents may be employed, such as alkoxy silanes having the formula Si—OR, wherein R is H, alkyl (e.g., methyl), alkenyl, carboxyalkyl (e.g., acetyl), and so forth.

The hydrophobic additive including the organosilane may include one or more components having the following general structure:

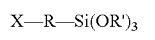

wherein

- X can be a non-hydrolysable organic moiety comprising an epoxy, amino, vinyl methacryloxy, or sulfido moiety;
- R can be an arylene or an alkylene; and
- OR' can be a moiety that can be hydrolysable.

As indicated above, X can be a non-hydrolysable organic moiety comprising an epoxy, amino, vinyl methacryloxy, or sulfido moiety. In one embodiment, X may be a non-hydrolysable organic moiety comprising an epoxy. In another embodiment, X may be a non-hydrolysable organic moiety comprising an amino.

As indicated above, R can be an arylene or an alkylene chain. For instance, in one embodiment, R may be arylene, such as a $C_5$-$C_{10}$ arylene, such as a $C_5$-$C_8$ arylene, such as a $C_5$-$C_6$ arylene, such as a $C_5$ arylene or a $C_6$ arylene. In another embodiment, R may be an alkylene. For example, the alkylene may be a $C_1$-$C_6$ alkylene, such as a $C_1$-$C_4$ alkylene, such as a $C_1$-$C_3$ alkylene, such as a $C_1$-$C_2$ alkylene or a $C_2$-$C_3$ alkylene. In one embodiment, R may be ethylene. In another embodiment, R may be propylene.

As indicated above, OR' can be a moiety that can be hydrolysable. For instance, the moiety may be an alkoxy group (e.g., methoxy, ethoxy, isoproxy, butoxy) or an acetoxy group. In one embodiment, the moiety may be an alkoxy group. For example, in one embodiment, the moiety may be methoxy.

The hydrophobic additive, such as the organosilane, that can be used in the coating can be bifunctional, wherein each molecule exhibits at least two reactive binding sites. The organosilane may include, but is not limited to, an epoxy silane (e.g., γ-glycidyloxypropyltrimethoxysilane), a glycidyl ether alkoxysilane, a glycidylalkyl alkoxysilane, an amino silane, an alkoxysilane, an aminoalkoxysilane, an alkyl silane, a vinyl silane, an acryloyl or methacryloyl-functional alkoxysilane, a sulfane or polysulfane-functional alkoxysilane, a mercapto-functional alkoxysilane, or a mixture thereof. In one embodiment, the organosilane may be an epoxy silane. In another embodiment, the organosilane may be an alkoxysilane, such as a halogen (e.g., chloro-, fluoro-) functional alkoxysilane.

For example, the organosilane may include, but is not limited to, γ-glycidyloxypropyltrimethoxysilane; N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyl tri ethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris(beta-methoxyethoxy)silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r- aminopropyltrimethoxysilane; r-mercaptopropyltrimethoxysilane; r-chloropropyltrimethoxysilane; hydrogentrimethoxysilane, hydrogentriethoxysilane, tetramethoxysilane, tetraethoxysilane, methyltrimethoxysilane, methyltriethoxysilane, methyltripropoxysilane, ethyltrimethoxysilane, ethyltriethoxysilane, n-propyltrimethoxysilane, isopropyltrimethoxysilane, n-propyltriethoxysilane, isopropyltriethoxysilane, n-butyltrimethoxysilane, isobutyltrimethoxysilane, n-butyltriethoxysilane, isobutyltriethoxysilane, n-pentyltrimethoxysilane, isopentyltrimethoxysilane, n-pentyltriethoxysilane, isopentyltriethoxysilane, n-hexyltrimethoxysilane, isohexyltrimethoxysilane, n-octyltrimethoxysilane, isooctyltrimethoxysilane, n-octyltriethoxysilane, isooctyltriethoxysilane, hexadecyltrimethoxysilane, hexadecyltriethoxysilane, octadecyltrimethoxysilane, octadecyltriethoxysilane, dimethyldimethoxysilane, dimethyldiethoxysilane, n-butylmethyldimethoxysilane, isobutylmethyldimethoxysilane, n-butylmethyldiethoxysilane, isobutylmethyldiethoxysilane, cyclohexylmethyldimethoxysilane, diisopropyldimethoxysilane, diisobutyldimethoxysilane, isobutylisopropyldimethoxysilane, vinyltrimethoxysilane, vinyltriethoxysilane, vinylmethyldialkoxysilane, vinyltris (2-methoxyethoxysilane), 1-aminomethyltrimethoxysilane, 1-aminomethyltriethoxysilane, 2-aminoethyltrimethoxysilane, 2-aminoethyltriethoxysilane, 3-aminopropyltrimethoxysilane, 3-aminopropyltriethoxysilane, 3-aminoisobutyltrimethoxysilane, 3-aminoisobutyltriethoxysilane, N-(n-butyl)-3-aminopropyltrimethoxysilane, 3-aminopropylmethyldiethoxysilane, 3-ureidopropyltrimethoxysilane, 3-ureidopropyltriethoxysilane, N-aminoethyl-3-aminopropyltrimethoxysilane, N-aminoethyl-3-aminopropyltriethoxysilane, triamino-functional propyltrimethoxysilane, 3-(4,5-dihydroimidazolyl)propyltriethoxysilane, 3-glycidyloxypropyltrimethoxysilane, 3-glycidyloxypropyltriethoxysilane, tridecafluorooctyltriethoxysilane, tridecafluorooctyltrimethoxysilane, 3-chloropropyltriethoxysilane, acryloyloxypropyltrimethoxysilane, acryloyloxypropyltriethoxysilane, 3-methacryloyloxypropyltrimethoxysilane, 3-methacryloyloxypropyltriethoxysilane, 3-methacryloyloxyisobutyltrimethoxysilane, 3-methacryloyloxyisobutyltriethoxysilane, 3-methacryloyloxy-2-methylpropyltrimethoxysilane, 3-methacryloyloxy-2-methylpropyltriethoxysilane, 3-mercaptopropyltrimethoxysilane, 3-mercaptopropyltriethoxysilane, (triethoxysilylpropyl)tetrasulfane, bis (trimethoxysilylpropyl)tetrasulfane, bis(triethoxysilylpropyl)disulfane, bis(trimethoxysilylpropyl)disulfane, bis (triethoxysilylpropyl)sulfane, bis(trimethoxysilylpropyl) sulfane, bis(triethoxysilylpropyl)pentasulfane, bis (trimethoxysilylpropyl)pentasulfane, or a mixture thereof.

As indicated by the structure above, the organosilane may differ from the siloxane rubber in that the organosilane may be a distinct compound, rather than an oligomer or polymer, whether a thermoset or thermoplastic. Meanwhile, the siloxane rubber may be an oligomer or polymeric type material, in particular a thermoplastic or thermoset type material.

As indicated above, the hydrophobic additive includes an organosilane. However, it should be understood that the hydrophobic additive may include other conventional hydrophobic additives along with the organosilane.

The hydrophobic additive, such as the organosiloxane, may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 3 wt. % or more, such as 5 wt. % or more, such as 10 wt. % or more. The organosilane may be present in the coating in an amount of 25 wt. % or less, such as 20 wt. % or less, such as 15 wt. % or less, such as 10 wt. % or less, such as 8 wt. % or less, such as 5 wt. % or less, such as 3 wt. % or less, such as 2 wt. % or less, such as 1 wt. % or less.

The pigment may include any general pigment utilized in the art. For instance, the pigment may be a natural pigment, a synthetic pigment, or a mixture thereof. The pigment may be an organic pigment, an inorganic pigment, or a mixture thereof. The pigment may be insoluble, such as in particle form, or may be soluble. The pigment may include, but is not limited to, cadmium pigments such as cadmium yellow, cadmium red, cadmium green, cadmium orange; carbon pigments such as carbon black (including vine black and lamp black), ivory black (bone char); chromium pigments such as chrome yellow and chrome green; cobalt pigments such as cobalt violet, cobalt blue, cerulean blue, aureolin (cobalt yellow); copper pigments such as Han purple, Egyptian blue, Paris green, verdigris and viridant; iron oxide pigments such as sanguine, caput mortuum, oxide red, red ochre, Venetian red and Prussian blue; clay earth pigments (iron oxides) such as yellow ochre, raw sienna, burnt sienna, raw umber and burnt umber; lead pigments such as lead white, Naples yellow and red lead; mercury pigments such as vermilion; titanium pigments such as titanium yellow, titanium beige, titanium white and titanium black; ultramarine pigments such as ultramarine and ultramarine green shade; zinc pigments such as zinc white and zinc ferrite; organic pigments such as alizarin (synthesized), alizarin crimson (synthesized), gamboge, cochineal red, rose madder, indigo, Indian yellow, Tyrian purple, quinacridone, magenta, phthalo green, phthalo blue, pigment red 170; or a mixture thereof.

The pigment may be present in the coating in an amount of 0.0001 wt. % or more, such as 0.0005 wt. % or more, such as 0.001 wt. % or more, such as 0.005 wt. % or more, such as 0.01 wt. % or more, such as 0.05 wt. % or more, such as 0.1 wt. % or more, such as 0.5 wt. % or more, such as 1 wt. % or more, such as 3 wt. % or more, such as 5 wt. % or more. The pigment may be present in the coating in an amount of 20 wt. % or less, such as 15 wt. % or less, such as 10 wt. % or less, such as 8 wt. % or less, such as 5 wt. % or less, such as 3 wt. % or less, such as 2 wt. % or less, such as 1 wt. % or less.

The dispersant may include, but is not limited to, an aminoalcohol, a polycarboxylate dispersant, a polyphosphate dispersant, a sulfonate dispersant, a diol, or a mixture thereof. In one embodiment, the dispersant may include an aminoalcohol (e.g., 2-amino-2-methyl). In another embodiment, the dispersant may include a polycarboxylate dispersant, such as a polycarboxylic ether dispersant. In another embodiment, the dispersant may include a sulfonate dispersant, such as naphthalene sulfonate, naphthalene sulfonate formaldehyde condensate, sodium naphthalene sulfonate formaldehyde condensation, lignosulfonate, or a mixture thereof. In one embodiment, the dispersant may include a polyphosphate dispersant, such as sodium trimetaphosphate, sodium tripolyphosphate, potassium tripolyphosphate, tetrasodium pyrophosphate, tetrapotassium pyrophosphate, tetrapotassium pyrophosphate, or a mixture thereof. In one embodiment, the dispersant may include a diol, such as short chain diol such as a propanediol, a butanediol, a pentanediol, or a mixture thereof.

The dispersant may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 2 wt. % or more, such as 3 wt. % or more. The dispersant may be present in the coating in an amount of 15 wt. % or less, such as 10 wt. % or less, such as 8 wt. % or less, such as 5 wt. % or less, such as 3 wt. % or less, such as 2 wt. % or less, such as 1 wt. % or less.

The surfactant may be an anionic surfactant, a cationic surfactant, a non-ionic surfactant, a fluorinated surfactant, a silicon surfactant, or a mixture thereof. In one embodiment, the surfactant may include an anionic surfactant, such as a sulfate (e.g., ammonium lauryl sulfate, sodium lauryl sulfate, sodium laureth sulfate, sodium myreth sulfate), a sulfonate (e.g., perfluorobutane sulfonate, dodecyl benzene sulfonate, alpha-olefin sulfonate, etc.), a phosphate (alkyl-aryl ether phosphates, alkyl ether phosphates, etc.), a phosphite, a phosphonate, a carboxylate (e.g., sodium stearate, etc.), or a mixture thereof. The sulfate may be an alkyl sulfate, alkyl ether sulfate, sulfated alkanolamide, glyceride sulfate, etc., or a mixture thereof. In one embodiment, the surfactant may include a cationic surfactant, such as a quaternary ammonium salt (e.g., cetrimonium bromide, cetylpyridinium chloride, benzalkonium chloride, benzethonium chloride, dimethyldioctadecylammonium chloride, and dioctadecyldimethylammonium bromide, etc.). In one embodiment, the surfactant may include a non-ionic surfactant, such as ethoxylates such as linear alcohol ethoxylates (e.g., narrow-range ethoxylate, octaethylene glycol monododecyl ether, pentaethylene glycol monododecyl ether, etc.), alkylphenol ethoxylates (e.g., nonoxynols, octylphenol ethoxylate, etc.), fatty acid ethoxylates, ethoxylated fatty esters, ethoxylated amines and/or fatty acid amides (e.g., polyethoxylated tallow amine, cocamide monoethanolamine, cocamide diethanolamine, etc.), fatty acid esters of glycerol (e.g., glycerol monostearate, glycerol monolaurate, etc.), fatty acid esters of sorbitol (e.g., sorbitan monolaurate, sorbitan monostearate, sorbitan tristearate, etc.), alkyl polyglycosides (e.g., decyl glucoside, lauryl glucoside, octyl glucoside, etc.), or a mixture thereof. In one embodiment, the surfactant may be a silicon surfactant such as a polyether-modified siloxane.

The surfactant may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 2 wt. % or more, such as 3 wt. % or more. The surfactant may be present in the coating in an amount of 15 wt. % or less, such as 10 wt. % or less, such as 8 wt. % or less, such as 5 wt. % or less, such as 3 wt. % or less, such as 2 wt. % or less, such as 1 wt. % or less.

The rheology modifier may be an organic rheology modifier, an inorganic rheology modifier, or a mixture thereof. These modifiers may include, but are not limited to, cellulosics (e.g., methyl cellulose, hydroxyethyl cellulose, carboxymethyl cellulose, hydroxypropyl cellulose, etc.), acrylates and polyacrylates, associative thickeners (e.g., polyurethanes, urea, etc.), clays (e.g., silicates, etc.), organoclays (e.g., kaolin, smectite, illite, etc.), oils (e.g., hydrogenated castor oils), polyamides, etc.

The rheology modifier may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 2 wt. % or more, such as 3 wt. % or more. The rheology modifier may be present in the coating in an amount of 15 wt. % or less, such as 10 wt. % or less, such as 8 wt. % or less, such as 5 wt. % or less, such as 3 wt. % or less, such as 2 wt. % or less, such as 1 wt. % or less.

The coalescing agent may include, but is not limited to, ester alcohols, esters, glycol ethers, etc. Examples include, but are not limited to, 2,2,4-trimethyl-1,3-pentanediol mono-isobutyrate, 1-isopropyl-2,2-dimethyltrimethylene diisobutyrate, propylene glycol mono esters of aliphatic acids, propylene glycol ethers of aliphatic alcohols, etc., or a mixture thereof.

The coalescing agent may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 2 wt. % or more, such as 3 wt. % or more. The coalescing agent may be present in the coating in an amount of 15 wt. % or less, such as 10 wt. % or less, such as 8 wt. % or less, such as 5 wt. % or less, such as 3 wt. % or less, such as 2 wt. % or less, such as 1 wt. % or less.

The rust inhibitor may include a benzotriazole, a benzoate (e.g., sodium benzoate), a nitrite (e.g., sodium nitrite, calcium nitrite, lithium nitrite, etc.), a borate (e.g., barium borate, zinc borate, etc.), an amine (e.g., diaminopropane, dibutylamine, diethylhydroxylamine, dimethylethanolamine, ethylenediamine, hexamethylenetetramine, hydrazine, etc.), a phosphate (e.g., zinc phosphate, zinc dithiophosphate, etc.), an oxide (e.g., zinc oxide, lead oxide, etc.), benzalkonium chloride, etc., or a mixture thereof.

The rust inhibitor may be present in the coating in an amount of 0.001 wt. % or more, such as 0.005 wt. % or more, such as 0.01 wt. % or more, such as 0.05 wt. % or more, such as 0.1 wt. % or more, such as 0.2 wt. % or more, such as 0.5 wt. % or more, such as 1 wt. % or more, such as 2 wt. % or more, such as 3 wt. % or more. The rust inhibitor may be present in the coating in an amount of 15 wt. % or less, such as 10 wt. % or less, such as 8 wt. % or less, such as 5 wt. % or less, such as 3 wt. % or less, such as 2 wt. % or less, such as 1 wt. % or less.

The filler may include, but is not limited to, reinforcing fillers (e.g., glass fibers, metal fibers, polymer fibers, carbon fibers, etc.), mineral fillers (e.g., calcium carbonate, talc, silica, wollastonite, mica, etc.), glass beads, or a mixture thereof.

The filler may be present in the coating in an amount of 0.1 wt. % or more, such as 0.5 wt. % or more, such as 1 wt. % or more, such as 2 wt. % or more, such as 3 wt. % or more, such as 4 wt. % or more, such as 5 wt. % or more, such as 8 wt. % or more, such as 10 wt. % or more, such as 20 wt. % or more, such as 30 wt. % or more. The filler may be present in the coating in an amount of 50 wt. % or less, such as 40 wt. % or less, such as 30 wt. % or less, such as 25 wt. % or less, such as 20 wt. % or less, such as 15 wt. % or less, such as 10 wt. % or less, such as 8 wt. % or less, such as 5 wt. % or less, such as 3 wt. % or less, such as 2 wt. % or less, such as 1 wt. % or less.

As indicated above, the coating may include various components. Such components may be combined and formulated using means known in the art. In this regard, the method for forming the coating formulation which is then applied to the glass mat facing material is not limited by the present invention. In one embodiment, the coating may be formed in accordance with the method disclosed in US Patent Publication No. 2016/0096970, which is incorporated herein by reference in its entirety.

The coating as disclosed herein may be a monolayer or single layer coating in one embodiment. In another embodiment, the coating may be a multilayer coating. For instance, the coating may include a combination of coatings. In this regard, the multilayer coating may include more than 1, such as 2 or more, such as 3 or more coating layers. In this regard, in one embodiment, each coating layer may be a coating as defined by the present invention. In addition, in one embodiment, the coating may be provided directly onto the facing material. In another embodiment, the coating may be provided indirectly onto the facing material.

When the coating comprises a multilayer coating, each coating layer may have a different chemistry based on the components as described herein. In this regard, each layer may be able to impart a different performance characteristic.

For instance, a first coating may be initially applied to the surface of the gypsum board and it may be allowed to sufficiently dry prior to application of a second coating. The first and second coatings may be the same or different in order to achieve suitable performance. As an example, conventional coated boards that exhibit sufficient surface elasticity to pass tests such as ASTM D1970-20, section 7.9 may also be highly likely to stick to one another or "block" as in when a stack of boards have to be peeled apart damaging the coating. By adjusting the coatings to address this issue, the performance of the board can be maintained.

In one embodiment of a multilayer coating, the first coating may generally be elastomeric (e.g., a low $T_g$ combination of polymers that form a resin and are combined with a hydrophobic additive and other optional additives to form an elastomeric coating). The second coating may be less elastomeric than the first coating, although still flexible, allowing the first coating to still seal around penetrations while preventing blocking to the next gypsum board. This combination of coatings can be very similar in make-up with just enough adjustments to change the functionality.

In another embodiment of a multilayer coating, the first coating and second coating may be the same but offer enough elasticity to seal with the use of two coatings while also being just rigid enough to avoid blocking. The first coating and the second coating, while being of the same composition, may be distinguished by an interface due to drying of the first coating.

In another embodiment of a multilayer coating, the first coating may be continuous in order to seal around a fastener at any location while the second coating may be applied in a pattern or non-continuous manner so as to allow the first coating to be maximally elastic and yet still prevent blocking. In yet another embodiment, the non-continuous secondary coating may be formed of dots, drops, or shapes and/or have a caliper thick enough so that a drainage plain is created when installed in a vertical orientation. In this regard, in one embodiment, the non-continuous secondary coating, such as dots, may be at least ⅛" thick. The drainage plane may facilitate the removal of water by providing a path for water to flow.

In addition, the method for providing the coating on the glass mat facing material is not limited by the present invention. For instance, the coating formulation may be provided onto the glass mat facing material using means known in the art such as, but not limited to, spraying, dipping, roll coating, curtain coating, etc. Once provided onto the glass mat facing material, the material and coating may then be allowed to dry so that the coated glass mat facing material can then be utilized for forming the gypsum board.

The gypsum board disclosed herein may have many applications. For instance, the gypsum board may be used as a standalone board in construction for the preparation of walls, ceilings, floors, etc. As used in the present disclosure, the term "gypsum board," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed gypsum board forms part of a building structure, such as a wall or ceiling.

The thickness of the gypsum board, and in particular, the gypsum core, is not necessarily limited and may be from about 0.25 inches to about 1 inch. For instance, the thickness may be at least ¼ inches, such as at least 5/16 inches, such as at least ⅜ inches, such as at least ½ inches, such as at least ⅝ inches, such as at least ¾ inches, such as at least 1 inch. In this regard, the thickness may be about any one of the aforementioned values. For instance, the thickness may be about ¼ inches. Alternatively, the thickness may be about ⅜ inches. In another embodiment, the thickness may be about ½ inches. In a further embodiment, the thickness may be about ⅝ inches. In another further embodiment, thickness may be about 1 inch. In addition, at least two gypsum boards may be combined to create another gypsum board. For example, at least two gypsum boards having a thickness of about 5/16 inches each may be combined or sandwiched to create a gypsum board having a thickness of about ⅝ inches. While this is one example, it should be understood that any combination of gypsum boards may be utilized to prepare a sandwiched gypsum board. With regard to the thickness, the term "about" may be defined as within 10%, such as within 5%, such as within 4%, such as within 3%, such as within 2%, such as within 1%.

In addition, the board weight of the gypsum board is not necessarily limited. For instance, the gypsum board may have a board weight of 500 lbs/MSF or more, such as about 600 lbs/MSF or more, such as about 700 lbs/MSF or more, such as about 800 lbs/MSF or more, such as about 900 lbs/MSF or more, such as about 1000 lbs/MSF or more, such as about 1100 lbs/MSF or more, such as about 1200 lbs/MSF or more, such as about 1300 lbs/MSF or more, such as about 1400 lbs/MSF or more, such as about 1500 lbs/MSF or more. The board weight may be about 7000 lbs/MSF or less, such as about 6000 lbs/MSF or less, such as about 5000 lbs/MSF or less, such as about 4000 lbs/MSF or less, such as about 3000 lbs/MSF or less, such as about 2500 lbs/MSF or less, such as about 2000 lbs/MSF or less, such as about 1800 lbs/MSF or less, such as about 1600 lbs/MSF or less, such as about 1500 lbs/MSF or less, such as about 1400 lbs/MSF or less, such as about 1300 lbs/MSF or less, such as about 1200 lbs/MSF or less. Such board weight may be a dry board weight such as after the board leaves the heating or drying device (e.g., kiln).

In addition, the gypsum board may have a density of about 5 pcf or more, such as about 10 pcf or more, such as about 15 pcf or more, such as about 20 pcf or more. The board may have a density of about 60 pcf or less, such as about 50 pcf or less, such as about 40 pcf or less, such as about 35 pcf or less, such as about 33 pcf or less, such as about 30 pcf or less, such as about 28 pcf or less, such as about 25 pcf or less, such as about 23 pcf or less, such as about 20 pcf or less.

The gypsum board may have a certain nail pull resistance, which generally is a measure of the force required to pull a gypsum panel off of a wall by forcing a fastening nail through the panel. The values obtained from the nail pull test generally indicate the maximum stress achieved while the fastener head penetrates through the board surface and core. In this regard, the gypsum board exhibits a nail pull resistance of at least about 25 $lb_f$, such as at least about 30 pounds, such as at least about 35 $lb_f$, such as at least about 40 $lb_f$, such as at least about 45 $lb_f$, such as at least about 50 $lb_f$, such as at least about 55 $lb_f$, such as at least about 60 $lb_f$, such as at least about 65 $lb_f$, such as at least about 70 $lb_f$, such as at least about 75 $lb_f$, such as at least about 77 $lb_f$, such as at least about 80 $lb_f$, such as at least about 85 $lb_f$, such as at least about 90 $lb_f$, such as at least about 95 $lb_f$, such as at least about 100 $lb_f$ as tested according to ASTM C1396. The nail pull resistance may be about 150 $lb_f$ or less, such as about 140 $lb_f$ or less, such as about 130 $lb_f$ or less, such as about 120 $lb_f$ or less, such as about 110 $lb_f$ or less, such as about 105 $lb_f$ or less, such as about 100 $lb_f$ or less, such as about 95 $lb_f$ or less, such as about 90 $lb_f$ or less, such as about 85 $lb_f$ or less, such as about 80 $lb_f$ or less as tested according to ASTM C1396. Such nail pull resistance may be based upon the thickness of the gypsum board. For instance, when conducting a test, such nail pull resistance values may vary depending on the thickness of the gypsum board. As an example, the nail pull resistance values above may be for a ⅝-inch board. However, it should be understood that instead of a ⅝-inch board, such nail pull resistance values may be for any other thickness gypsum board as mentioned herein.

The gypsum board may have a certain compressive strength. For instance, the compressive strength may be about 150 psi or more, such as about 200 psi or more, such as about 250 psi or more, such as about 300 psi or more, such as about 350 psi or more, such as about 375 psi or more, such as about 400 psi or more, such as about 500 psi or more as tested according to ASTM C473. The compressive strength may be about 3000 psi or less, such as about 2500 psi or less, such as about 2000 psi or less, such as about 1700 psi or less, such as about 1500 psi or less, such as about 1300 psi or less, such as about 1100 psi or less, such as about 1000 psi or less, such as about 900 psi or less, such as about 800 psi or less, such as about 700 psi or less, such as about 600 psi or less, such as about 500 psi or less. Such compressive strength may be based upon the density and thickness of the gypsum board. For instance, when conducting a test, such compressive strength values may vary depending on the thickness of the gypsum board. As an example, the compressive strength values above may be for a ⅝-inch board. However, it should be understood that instead of a ⅝-inch board, such compressive strength values may be for any other thickness gypsum board as mentioned herein.

In addition, the gypsum board may have a core hardness of at least about 8 $lb_f$, such as at least about 10 $lb_f$, such as at least about 11 $lb_f$, such as at least about 12 $lb_f$, such as at least about 15 $lb_f$, such as at least about 18 $lb_f$, such as at least about 20 $lb_f$ as tested according to ASTM C1396. The gypsum board may have a core hardness of 50 $lb_f$ or less, such as about 40 $lb_f$ or less, such as about 35 $lb_f$ or less, such as about 30 $lb_f$ or less, such as about 25 $lb_f$ or less, such as about 20 $lb_f$ or less, such as about 18 $lb_f$ or less, such as about 15 $lb_f$ or less as tested according to ASTM C1396. In addition, the gypsum board may have an end hardness according to the aforementioned values. Further, the gypsum board may have an edge hardness according to the aforementioned values. Such core hardness may be based upon the thickness of the gypsum board. For instance, when conducting a test, such core hardness values may vary depending on the thickness of the gypsum board. As an example, the core hardness values above may be for a ⅝-inch board. However, it should be understood that instead of a ⅝-inch board, such core hardness values may be for any other thickness gypsum board as mentioned herein.

In addition to the gypsum board, the coated facing material may also have certain desired properties, such as mechanical properties. For instance, the facing material may have an elongation of 0.9% or more, such as 1% or more, such as 1.1% or more, such as 1.2% or more, such as 1.3% or more, such as 1.4% or more, such as 1.5% or more, such as 1.6% or more, such as 1.7% or more, such as 1.8% or more, such as 1.9% or more, such as 2% or more, such as 2.1% or more, such as 2.2% or more, such as 2.3% or more, such as 2.4% or more, such as 2.5% or more, such as 2.6% or more, such as 2.7% or more, such as 2.8% or more, such as 2.9% or more, such as 3% or more. The elongation may be 10% or less, such as 8% or less, such as 6% or less, such as 5% or less, such as 4% or less, such as 3.5% or less, such as 3% or less, such as 2.8% or less, such as 2.6% or less, such as 2.4% or less, such as 2.2% or less, such as 2% or less, such as 1.8% or less, such as 1.6% or less, such as 1.4% or less, such as 1.2% or less. Such elongation may be for the facing material having a basecoat or a basecoat and a topcoat.

In addition, the tensile energy absorption, such as of the coated facing material, may be 0.001 lbf/in or more, such as 0.005 lbf/in or more, such as 0.01 lbf/in or more, such as 0.02 lbf/in or more, such as 0.03 lbf/in or more, such as 0.04 lbf/in or more, such as 0.05 lbf/in or more, such as 0.06 lbf/in or more, such as 0.08 lbf/in or more, such as 0.1 lbf/in or more, such as 0.12 lbf/in or more, such as 0.14 lbf/in or more. The tensile energy absorption may be 0.5 lbf or less, such as 0.4 lbf or less, such as 0.3 lbf or less, such as 0.2 lbf or less, such as 0.18 lbf or less, such as 0.16 lbf or less, such as 0.14 lbf or less, such as 0.12 lbf or less, such as 0.11 lbf or less, such as 0.1 lbf or less, such as 0.09 lbf or less, such as 0.07 lbf or less, such as 0.05 lbf or less. Such tensile energy absorption may be for the facing material having a basecoat or a basecoat and a topcoat.

Also, the maximum load, such as of the coated facing material, may be 1 lbf or more, such as 1.5 lbf or more, such as 2 lbf or more, such as 2.5 lbf or more, such as 3 lbf or more, such as 3.2 lbf or more, such as 3.5 lbf or more, such as 3.8 lbf or more, such as 4 lbf or more, such as 4.5 lbf or more, such as 5 lbf or more, such as 6 lbf or more, such as 7 lbf or more, such as 8 lbf or more. The maximum load may be 10 lbf or less, such as 8 lbf or less, such as 6 lbf or less, such as 5 lbf or less, such as 4.8 lbf or less, such as 4.3 lbf or less, such as 4 lbf or less, such as 3.8 lbf or less, such as 3.5 lbf or less, such as 3.3 lbf or less. Such maximum load may be for the facing material having a basecoat or a basecoat and a topcoat.

EXAMPLES

Test Methods

Tensile Properties: The tensile properties of the coating facing material were determined in accordance with modified ASTM D412. The samples were 1.75" in width and 4" in length with a 1/16" gap at the midpoint of the sample. The test speed was 0.1 in/min+/−0.002 in/min. Also, five measurements were taken for each type of sample and the average was recorded.

Example 1

The tensile properties of glass-mat samples were determined. Each sample was coated with a basecoat with a target weight of 2.0 grams. The basecoat covered the 1/16" gap and extended ½" above and below the gap. The samples were dried in an IR oven at 315° F. for 3 minutes and then placed in a 70° F./50% humidity chamber for conditioning for 12 hours.

Additional samples were also prepared with a continuous or non-continuous topcoat on the basecoat. In particular, the continuous topcoat received a target weight of 0.5 grams and the non-continuous topcoat received a target weight of 0.2 grams. The samples were dried in an IR oven at 315° F. for 3 minutes and then placed in a 70° F./50% humidity chamber for conditioning for 12 hours. The non-continuous topcoat included patterns such as squares and dots.

Each basecoat included a polymer, a filler, and various additives and was formed from a composition including water. Each topcoat included a polymer, a filler, and various additives and was formed from a composition including water.

The results of the samples are provided in the table below.

| | Elongation (%) | Maximum Load (lbf) | Tensile Extension (in) | Max Load/Width (lbf/in) | TEA (lbf/in) |
|---|---|---|---|---|---|
| Basecoat 1 Only | 1.3555 | 1.6655 | 0.15 | 0.9515 | 0.02465 |
| Basecoat 1/Continuous Topcoat | 0.959 | 3.7225 | 0.15 | 2.129 | 0.0501 |
| Basecoat 1/Non-Continuous Topcoat 1 | 1.2455 | 4.004 | 0.15 | 2.2865 | 0.0563 |
| Basecoat 1/Non-Continuous Topcoat 2 | 1.664 | 4.5715 | 0.15 | 2.611 | 0.06895 |
| Basecoat 1/Non-Continuous Topcoat 3 | 1.549 | 3.393 | 0.15 | 1.941 | 0.05155 |
| Basecoat 2 Only | 2.9995 | 3.9055 | 0.15 | 2.2335 | 0.05095 |
| Basecoat 2/Continuous Topcoat | 2.721 | 8.4025 | 0.15 | 4.8015 | 0.1215 |

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A gypsum board comprising:

a gypsum core, the gypsum core comprising calcium sulfate dihydrate in an amount of at least 50 wt. % of the gypsum core; and a glass mat facing material including a first coating and a second coating, wherein the first coating is continuous, the first coating comprising a resin including an acrylic resin, a siloxane rubber, or a mixture thereof and a hydrophobic additive comprising an organosilane, wherein the second coating is a non-continuous coating;

wherein the gypsum board passes at least one of the three air and water barrier tests specified in AC-212 wherein the tests comprise a water penetration barrier test as conducted in accordance with ASTM E331-00, a hydrostatic head test as conducted in accordance with AATCC 127-2008, or an air barrier test as conducted in accordance with ASTM E2357-11;

wherein the gypsum board has a density from about 20 pcf to about 60 pcf.

2. The gypsum board of claim 1, wherein the gypsum board passes at least two of the three air and water barrier tests specified in AC-212.

3. The gypsum board of claim 1, wherein the gypsum board passes all three of the air and water barrier tests specified in AC-212.

4. The gypsum board of claim 1, wherein the gypsum board exhibits a passing rate of at least 80% as determined in accordance with the hydrostatic head test of AATCC 127-2008.

5. The gypsum board of claim 1, wherein the gypsum board further exhibits a passing rate of at least 80% for a nail sealability test determined in accordance with ASTM D1970-20, section 7.9.

6. The gypsum board of claim 1, wherein the resin is present in the first coating in an amount of 20 wt. % to 98 wt. % and/or the hydrophobic additive is present in the first coating in an amount of 0.001 wt. % to 25 wt. %.

7. The gypsum board of claim 1, wherein the resin comprises an acrylic resin.

8. The gypsum board of claim 7, wherein the acrylic resin comprises an acrylate monomer or polymer.

9. The gypsum board of claim 7, wherein the acrylic resin comprises a methacrylate monomer or polymer.

10. The gypsum board of claim 1, wherein the resin comprises a siloxane rubber.

11. The gypsum board of claim 10, wherein the siloxane rubber comprises a polyorganosiloxane.

12. The gypsum board of claim 10, wherein the siloxane rubber comprises a polydimethylsiloxane.

13. The gypsum board of claim 1, wherein the organosilane comprises one or more components having the following general structure:

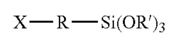

wherein

X can be a non-hydrolysable organic moiety comprising an epoxy, amino, vinyl methacryloxy, or sulfido moiety;

R can be an arylene or an alkylene; and

OR' can be a moiety that can be hydrolysable.

14. The gypsum board of claim 13, wherein X is a non-hydrolysable organic moiety comprising an epoxy moiety.

15. The gypsum board of claim 13, wherein X is a non-hydrolysable organic moiety comprising an amino moiety.

16. The gypsum board of claim 13, wherein R is an alkylene.

17. The gypsum board of claim 1, wherein the second coating is in the form of a pattern.

18. The gypsum board of claim 1, wherein the second coating is at least ⅛ inch thick.

19. The gypsum board of claim 1, wherein the resin is present in the first coating in an amount of 20 wt. % to 98 wt. % and the hydrophobic additive is present in the first coating in an amount of 0.001 wt. % to 25 wt. %.

20. A gypsum board comprising:

a gypsum core, the gypsum core comprising calcium sulfate dihydrate in an amount of at least 50 wt. % of the gypsum core; and a glass mat facing material including a first coating and a second coating, wherein the first coating comprises a resin including an acrylic resin, a siloxane rubber, or a mixture thereof and a hydrophobic additive comprising an organosilane, wherein the second coating is a non-continuous coating, the second coating being at least ⅛ inch thick;

wherein the gypsum board passes at least one of the three air and water barrier tests specified in AC-212 wherein the tests comprise a water penetration barrier test as conducted in accordance with ASTM E331-00, a hydrostatic head test as conducted in accordance with AATCC 127-2008, or an air barrier test as conducted in accordance with ASTM E2357-11;

wherein the gypsum board has a density from about 20 pcf to about 60 pcf.

21. The gypsum board of claim 20, wherein the resin is present in the first coating in an amount of 20 wt. % to 98 wt. % and/or the hydrophobic additive is present in the first coating in an amount of 0.001 wt. % to 25 wt. %.

22. The gypsum board of claim 20, wherein the resin is present in the first coating in an amount of 20 wt. % to 98 wt. % and the hydrophobic additive is present in the first coating in an amount of 0.001 wt. % to 25 wt. %.

23. The gypsum board of claim 22, wherein the second coating is in the form of a pattern.

* * * * *